United States Patent [19]

Penet

[11] 4,086,811
[45] May 2, 1978

[54] SYSTEM FOR MOUNTING ROTARY COMPONENTS

[76] Inventor: Pierre Marie Marcel Penet, 4 Rue de Bourgogne, Creteil, France, 94

[21] Appl. No.: 764,574

[22] Filed: Feb. 1, 1977

[30] Foreign Application Priority Data

Feb. 2, 1976 France .................................. 76 02712

[51] Int. Cl.² .............................................. G01F 1/10
[52] U.S. Cl. ................................. 73/231 R; 73/272 R
[58] Field of Search ..................... 73/230, 231, 272 R; 308/15 R

[56] References Cited

U.S. PATENT DOCUMENTS 3,043,140  7/1962  Waugh et al. ..................... 73/230 X
3,604,265  9/1971  Wilson, Jr. et al. ................... 73/231
3,710,622  1/1973  Hammond et al. ..................... 73/231

*Primary Examiner*—Herbert Goldstein
*Attorney, Agent, or Firm*—William J. Daniel

[57] ABSTRACT

A system for mounting a device comprising two rotors which rotate coaxially in a stator comprising two spaced-apart supports held in the stator, a stationary shaft secured by one of these supports in cantilever manner coaxially with the stator and on which the first rotor is rotatably mounted, a first bearing formed at the free end of the stationary shaft and a second bearing secured by the second support coaxially with the stationary shaft, and a rotary shaft secured to the second rotor and rotatably mounted in the first and the second bearing.

12 Claims, 4 Drawing Figures

U.S. Patent  May 2, 1978  4,086,811
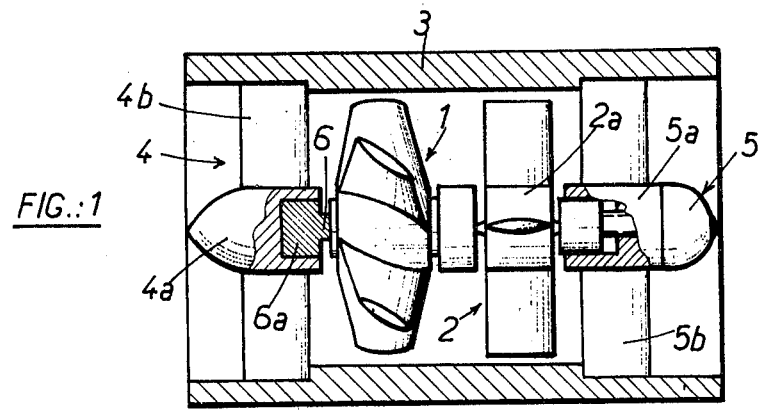
FIG.:1
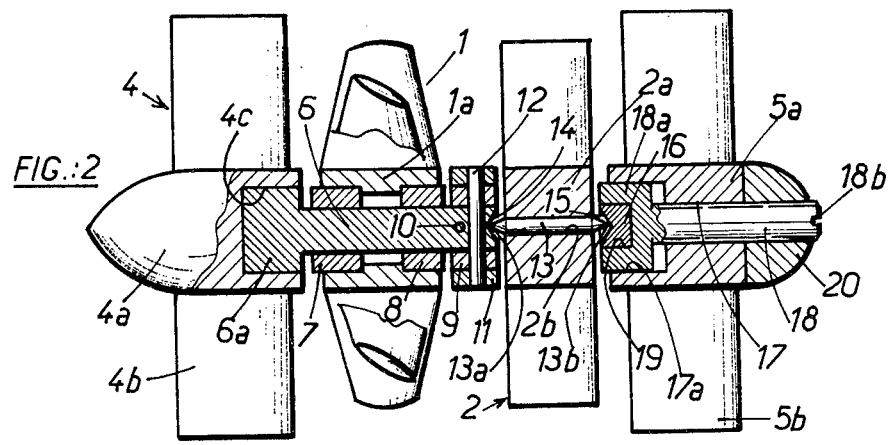
FIG.:2
FIG.:3
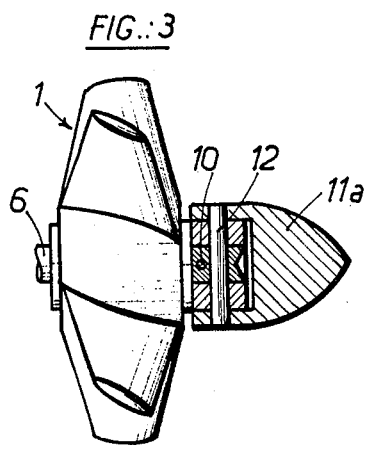
FIG.:4
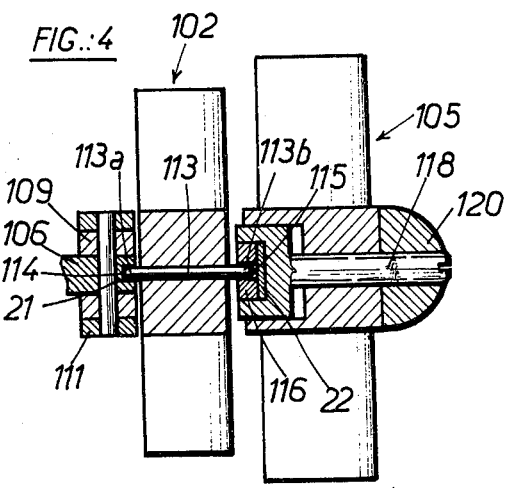

SYSTEM FOR MOUNTING ROTARY COMPONENTS

The invention relates to mounting a device comprising two coaxially rotating rotors and applies more particularly to impeller flowmeters, more particularly those described in U.S. Pat. No. 3,735,637.

In the present state of the art, it is conventional to construct flowmeters comprising an impeller secured to a shaft borne by plain bearings, ball bearings or ball races, secured on supports surrounding the rotating impeller. In another known system, the supports bear a shaft on which plain bearings or ball bearings secured to the impeller freely rotate.

In the cited patent, a second rotor is mounted downstream of the flowmeter impeller and measures the speed of rotation of the vortex produced by the rotating impeller during the flow of a fluid, the speed of which has to be measured. Clearly, this system imposes operating conditions which prevent the use of conventional methods of supporting rotors. It is not possible for any mechanical component for supporting the pivoting means associated with the two rotors to be inserted, as in conventional devices, into the portion of the flow between the two rotors, since such mechanical components would cause turbulence and reduce the accuracy of the device. On the other hand, it is imperative that the second rotor should rotate with very little friction, so that it does not slow down and reduce the sensitivity of the measurement of the rotation speeds of the vortex produced by the first rotor, since such speeds are very low and of the order of a few percent of the speed of the first rotor.

Finally, it is imperative that the mechanical friction torque should be constant, since otherwise the speed of the second rotor will vary and distort the measurements.

One object of the invention therefore is to construct a system for mounting two coaxial rotors without a mechanical support between them. Another object is to provide a very low-friction mounting system for two coaxial rotors. Still another object provide a mounting system having substantially constant friction, which more particularly is free from any risk of jamming.

The invention relates to a system for mounting a device comprising two rotors which rotate coaxially in a stator comprising first and second spaced-apart support held in the stator, a stationary shaft which is secured by the first support in cantilever manner coaxially with the stator and on which the first rotor is rotatably mounted, a first bearing formed at the free end of the stationary shaft and a second bearing secured by the second support coaxially with the stationary shaft, and a rotary shaft secured to the second rotor and rotatably mounted in the first and the second bearing.

Preferably, the stationary shaft is made of material having a low coefficient of friction and high resistance to mechanical stresses and abrasion, e.g. G 10 tungsten carbide produced by Societe Francaise Ugine-Kuhlmann. Advantageously, the stationary shaft is separate from the first support and has a widened head which is fitted with interference fit into a bore therein. Preferably, the first rotor is rotatably mounted on a tungsten-carbide component by means of rings made of the same material.

Preferably, the rotary shaft is distinct from the second rotor and is likewise made of material such as G 10 tungsten carbide, and the first and second bearings are made of the same material.

Other features and advantages of the invention will be clear from the following description and accompanying drawings, in which:

FIG. 1 is a diagrammatic axial section through a flowmeter comprising two rotors rotatably mounted by a mounting system according to the invention;

FIG. 2 is a partial view on a larger scale showing the mounting system in detail;

FIG. 3 is a partial view corresponding to FIG. 2, illustrating the possibility of converting the flowmeter into a device comprising a single rotor, and FIG. 4 is a partial view corresponding to FIG. 2, showing a variant method of mounting the second rotor.

FIG. 1 shows a flowmeter comprising two rotors 1, 2 of the kind described in U.S. Pat. No. 3,735,637 cited hereinbefore, and held in a pipe 3 by a mounting system according to the invention, which is shown in detail in FIG. 2.

The mounting system comprises a first and a second supports 4, 5 each comprising a stainless-steel cross-member having a central hub 4a, 5a secured in the axis of pipe 3 by a number of axially extending arms 4b, 5b. A G 10 tungsten carbide shaft 6 has a widened head 6a which is tightly fitted into a central bore 4c in support 4. Two rings 7, 8, likewise made of G 10 tungsten carbide, are tightly fitted into hub 1a or rotor 1 and rotate on shaft 6, thus forming a plain bearing. Ring 7 projects beyond that surface of hub 1a which faces support 1 and can abut the widened portion 6a of component 6 so as to limit the axial motion of rotor 1 towards support 4. The movement of rotor 1 in the direction is limited by a ring 9, likewise of G 10 tungsten carbide, which is secured to the end of shaft 6 by a pin 10 and which can abut ring 8, which projects beyond that surface of hub 1a remote from support 4. A stainless-steel ring 11, having the same outer diameter as hub 1a and used for a purpose explained hereinafter, is secured around ring 4 by a pin 12.

The hub 2a of rotor 2 has an axial bore 2b in which a stainless steel shaft 13 is tightly fitted. The two ends of shaft 13 are conical and have pointed tips 13a, 13b respectively and pivot in two conical depressions 14, 15 formed respectively at the free end of shaft 6 and in a component 16, likewise of G 10 tungsten carbide, held in the axis of pipe 3 by support 5. Hub 5a of support 5 has an axial threaded bore 17 counter-bored at 17a. The widened head 18a of a threaded rod 18 screwed in bore 17 can slide in counterbore 17a. Head 18a has an axial bore 19 receiving component 16. It is thus possible to adjust the distance between depression 14, 15 in order to compensate any play of shaft 13 therein, by screwing rod 18 to a varying extent into bore 17, by using a screwdriver engaging in a slot 18b at the free end of the threaded rod. Next, rod 18 is secured by a cap-shaped lock-nut 20.

As stated in the cited U.S. Pat. No. 3,735,637, rotor 1 is an impeller having inclined blades which is rotated at high speed by fluid flowing from left to right (in FIG. 1) in pipe 1, so as to measure the flow rate, whereas rotor 2 has blades which are straight, i.e. in coaxial planes, and is slowly rotated by the vortex formed in the fluid by the rotation of impeller 1, in order to correct the flow measurement. As a result of the described mounting system, shaft 13 cooperates with depression 14 and tends to hold it in the axis of pipe 3, thus reducing the risk that shaft 6 will be vibrated by the impeller 1 rotating at high speed. Owing to the low coefficient of friction of the material used, the rotation of the rotors is not slowed down. Rotor 2, since it is mounted between centres, does not resist the forces tending to rotate it, which is particularly important. Owing to the high resistance of the material to mechanical stresses and abrasion, the tendency to vibrate is further reduced and the wear on the components is insignificant. As a result of the plain-bearing mounting and the mounting between centres, there is no danger of the rotors being jammed by solid impurities.

However, without departing from the invention, rotor 1 can be mounted on shaft 6 by means of ball bearings or the like. This feature may be justified in certain cases when shaft 6 does not need to be made of a material having a low coefficient of friction.

Hubs 4a, and 1a, ring 11 and hubs 2a and 5a form a cylinder having a substantially uniform diameter which, owing to the cap shape of hub 4a and lock-nut 20, reduce the pressure drop imposed on the fluid. The same result can be obtained if ring 9 has the same diameter as hub 1a and ring 11 is omitted. However, ring 11 can reduce the amount of high-cost material required and facilitates conversion of the flowmeter into a device comprising a single rotor, by replacing ring 11 by a cap 11a (see FIG. 3) and omitting rotor 2.

Without departing from the invention, rod 18 and head 18a can be two separate components, between which a resilient device can be inserted so as to exert slight pressure on centre 13b and thus accurately centre the shaft 13. Without departing from the invention, centres 13a, 13b can be omitted as shown in FIG. 4, in which elements serving the same purpose as in FIG. 2 are denoted by the same reference numbers plus 100 units.

In FIG. 4, shaft 113 ends in two cylindrical journals 113a, 113b rotatably mounted in two bores 114, 115 formed respectively in the free end of shaft 106 and in component 116, thus forming a plain-bearing mounting, the free ends of journals 113a, 113b are spherical caps 21, 22 which respectively abut the end of bore 114 or a component 23 made of the same material as component 116, in order to limit the axial motion of rotor 102 in either direction.

I claim:

1. A system for mounting a first and a second rotor for coaxial rotation in a stator, the system comprising a first and a second support secured in the stator in spaced apart relation, a stationary shaft secured in cantilever fashion coaxially within the stator by the first support, means mounting the first rotor for rotation on said stationary shaft, a first bearing formed at the free end of the stationary shaft and a second bearing secured by the second support coaxially with the stationary shaft, and a rotary shaft secured to the second rotor and rotatably mounted in the first and the second bearings.

2. A system according to claim 1, wherein said stationary shaft is separate from the first support and is press-fitted at one end into a bore in the first support.

3. A system according to claim 2, wherein the means for mounting the first rotor on the stationary shaft comprise at least one rotary ring rotatably mounted on the stationary shaft.

4. A system according to claim 3, wherein the press-fitted end of said stationary shaft is enlarged and serves as an abutment for the rotary ring to limit the movement of the first rotor towards the first support.

5. A system according to claim 3, comprising an abutment ring and means mounting the abutment ring on the stationary shaft so as to serve as an abutment for the rotary ring and prevent the first rotor from moving towards the second support.

6. A system according to claim 5, wherein the first rotor is an impeller having a hub and blades, and the abutment ring has an outer diameter smaller than the hub diameter, the system comprising a further ring having an outer diameter equal to the hub diameter and an inner diameter equal to the outer diameter of the abutment ring, a cap having a hollow front portion, an outer diameter equal to that of the hub and an inner diameter equal to that of the abutment ring, and means whereby the further ring or the cap can be secured on to the abutment ring.

7. A system according to claim 2, wherein the the second bearing is formed in a component axially movable in a bore in the second support under the action of an adjusting screw cooperating with a thread in the second support.

8. A system according to claim 7, wherein the rotary shaft has two pointed conical ends and the first and second bearings are depressions receiving the pointed ends respectively.

9. A system according to claim 8, wherein the ends of the rotary shaft form cylindrical journals and the first and second bearings are bores receiving the journals respectively.

10. A system according to claim 1, wherein the second bearing is formed in a component which can move axially in a bore in the second support under the action of an adjusting screw cooperating with a thread in the second support.

11. A system according to claim 10, wherein the ends of the rotary shaft form cylindrical journals and the first and second bearings are bores in which the journals respectively engage.

12. A system according to claim 1, wherein the rotary shaft has two pointed conical ends and the first and second bearings are depressions receiving the pointed ends respectively.

* * * * *